United States Patent
Fieres et al.

(10) Patent No.: US 11,106,996 B2
(45) Date of Patent: Aug. 31, 2021

(54) MACHINE LEARNING BASED DATABASE MANAGEMENT

(71) Applicant: SAP SE, Walldorf (DE)

(72) Inventors: Helmut Fieres, Malsch (DE);
Jean-Pierre Djamdji, Nice (GR);
Klaus Dickgiesser, Karlsruhe (DE);
Olena Kushakovska, Cannes (FR);
Venkatesh R, Bangalore (IN)

(73) Assignee: SAP SE, Walldorf (DE)

( * ) Notice: Subject to any disclaimer, the term of this patent is extended or adjusted under 35 U.S.C. 154(b) by 905 days.

(21) Appl. No.: 15/684,796

(22) Filed: Aug. 23, 2017

(65) Prior Publication Data
US 2019/0065985 A1 Feb. 28, 2019

(51) Int. Cl.
*G06N 3/08* (2006.01)
*G06N 20/00* (2019.01)
*G06F 16/21* (2019.01)
*G06F 11/07* (2006.01)

(52) U.S. Cl.
CPC ......... *G06N 20/00* (2019.01); *G06F 11/0703* (2013.01); *G06F 16/217* (2019.01); *G06N 3/08* (2013.01)

(58) Field of Classification Search
CPC ..................................................... G06N 3/08
See application file for complete search history.

(56) References Cited

U.S. PATENT DOCUMENTS

| | | | |
|---|---|---|---|
| 8,266,109 B1* | 9/2012 | Bilsborough | G06F 16/113 707/661 |
| 9,110,797 B1* | 8/2015 | Lazier | G06F 11/1048 |
| 2011/0271146 A1* | 11/2011 | Mork | G06F 21/55 714/37 |
| 2014/0258187 A1* | 9/2014 | Suleiman | G06N 20/00 706/12 |
| 2015/0074023 A1* | 3/2015 | Gu | G06N 3/08 706/12 |
| 2015/0212869 A1* | 7/2015 | Chen | G06F 11/008 714/38.1 |

(Continued)

OTHER PUBLICATIONS

Tan, Yongmin, et al. "Prepare: Predictive performance anomaly prevention for virtualized cloud systems." 2012 IEEE 32nd International Conference on Distributed Computing Systems. IEEE, 2012. (Year: 2012).*

*Primary Examiner* — Hal Schnee
(74) *Attorney, Agent, or Firm* — Mintz Levin Cohn Ferris Glovsky and Popeo, P.C.

(57) ABSTRACT

A method for machine learning based database management is provided. The method may include training a machine learning model to detect an anomaly that is present and/or developing in a database system. The anomaly in the database system may be detected by at least processing, with a trained machine learning model, one or more performance metrics for the database system. In response to detecting the presence of the anomaly at the database system, one or more remedial actions may be determined for correcting and/or preventing the anomaly at the database system. The one or more remedial actions may further be sent to a database management system associated with the database system. Related systems and articles of manufacture are also provided.

18 Claims, 6 Drawing Sheets

(56) References Cited

U.S. PATENT DOCUMENTS

| | | | |
|---|---|---|---|
| 2015/0302318 A1* | 10/2015 | Chen | G06F 17/18 |
| | | | 706/12 |
| 2015/0355957 A1* | 12/2015 | Steiner | G06F 11/079 |
| | | | 714/37 |
| 2016/0088006 A1* | 3/2016 | Gupta | H04L 41/16 |
| | | | 726/23 |
| 2016/0224898 A1* | 8/2016 | Ryckbosch | G06N 20/00 |
| 2017/0091652 A1* | 3/2017 | Miao | G06Q 10/06 |
| 2018/0053109 A1* | 2/2018 | Caffrey | G06N 20/00 |
| 2018/0060159 A1* | 3/2018 | Justin | G06F 11/0787 |
| 2018/0096243 A1* | 4/2018 | Patil | G06N 3/0454 |
| 2018/0173453 A1* | 6/2018 | Danilov | G06F 3/0649 |
| 2019/0324831 A1* | 10/2019 | Gu | G06F 11/0793 |
| 2020/0050182 A1* | 2/2020 | Cheng | G05B 23/024 |

\* cited by examiner

MACHINE LEARNING BASED DATABASE MANAGEMENT

TECHNICAL FIELD

The subject matter described herein relates generally to database processing and more specifically to the use of machine learning in the management of databases.

BACKGROUND

The performance of a database system may be gauged based on a variety of different performance metrics. For example, the performance of a database system may be gauged based on the response time for executing database queries that include a single structured query language (SQL) statement and/or database transactions that include a sequence of SQL statements. The performance of a database system may also be gauged based on a buffer cache hit ratio, a frequency of errors when updating data held in the database system, and/or a frequency of dumps caused by applications running in the database system. Alternatively and/or additionally, the performance of a database system may be gauged based on the computing resources (e.g., processor, memory, and/or bandwidth) consumed by the operation of the database system.

SUMMARY

Systems, methods, and articles of manufacture, including computer program products, are provided for merging multiproviders. In one aspect, there is provided a system. The system may include at least one data processor and at least one memory. The at least one memory may store instructions that result in operations when executed by the at least one data processor. The operations may include: training a machine learning model to detect an anomaly that is present and/or developing in a database system; detecting the anomaly in the database system by at least processing, with a trained machine learning model, one or more performance metrics for the database system; and in response to detecting the presence of the anomaly at the database system: determining one or more remedial actions for correcting and/or preventing the anomaly at the database system; and sending, to a database management system associated with the database system, the one or more remedial actions.

In some variations, one or more features disclosed herein including the following features can optionally be included in any feasible combination. The training of the machine learning model may include processing, with the machine learning model, a plurality of performance metrics that are known to correspond to the presence of the anomaly. The one or more performance metrics for the database system may be received from the database management system. The one or more performance metrics may include performance per structured query language (SQL) statement, application performance per dialog step, database central processing unit (CPU) utilization, database memory consumption, application errors, and/or database update process errors.

In some variations, the trained machine learning model may be sent to the database management system. The trained machine learning model may be sent to the database management system to enable the one or more performance metrics to be processed at the database management system. At least one update for the trained machine learning model may also be sent to the database management system.

In some variations, the machine learning model may include a neural network, a classifier, a decision tree, a Bayesian network, a regression analyzer, and/or a support vector machine. The one or more remedial actions may include a parameter change at the database system and/or a parameter change for an application running at the database system.

In some variations, the database management system may be configured to execute the one or more remedial actions. The one or more remedial actions may be sent to the database management system using a generic data format. The one or more remedial actions may be sent to the database management system as structured data and/or unstructured data in a raw string format.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Different performance metrics such as, for example, performance per SQL statement, application performance per dialog step, database central processing unit (CPU) utilization, database memory consumption, application errors, database update process errors, and/or the like, may be used to determine the current operational state of a database system. Poor performance metrics may indicate the presence of anomalies within the database system such as, for example, bottlenecks and/or the like, that can lead to abnormal and/or undesirable behavior. However, anomalies may be present and/or developing within the database system even when the current performance metrics of the database system are not objectively poor. As such, in some example embodiments, a database management system (DBMS) may be configured to detect anomalies that are present and/or developing within a database system by at least processing, with a trained machine learning model, performance metrics that the database management system collects from the database system. The machine learning model may be trained to detect anomalies using training data that includes, for example, performance metrics that are known to correspond to the presence of existing and/or developing anomalies. In response to detecting an anomaly, the database management system may be configured to determine remedial actions for correcting the anomaly.

Figure 1:
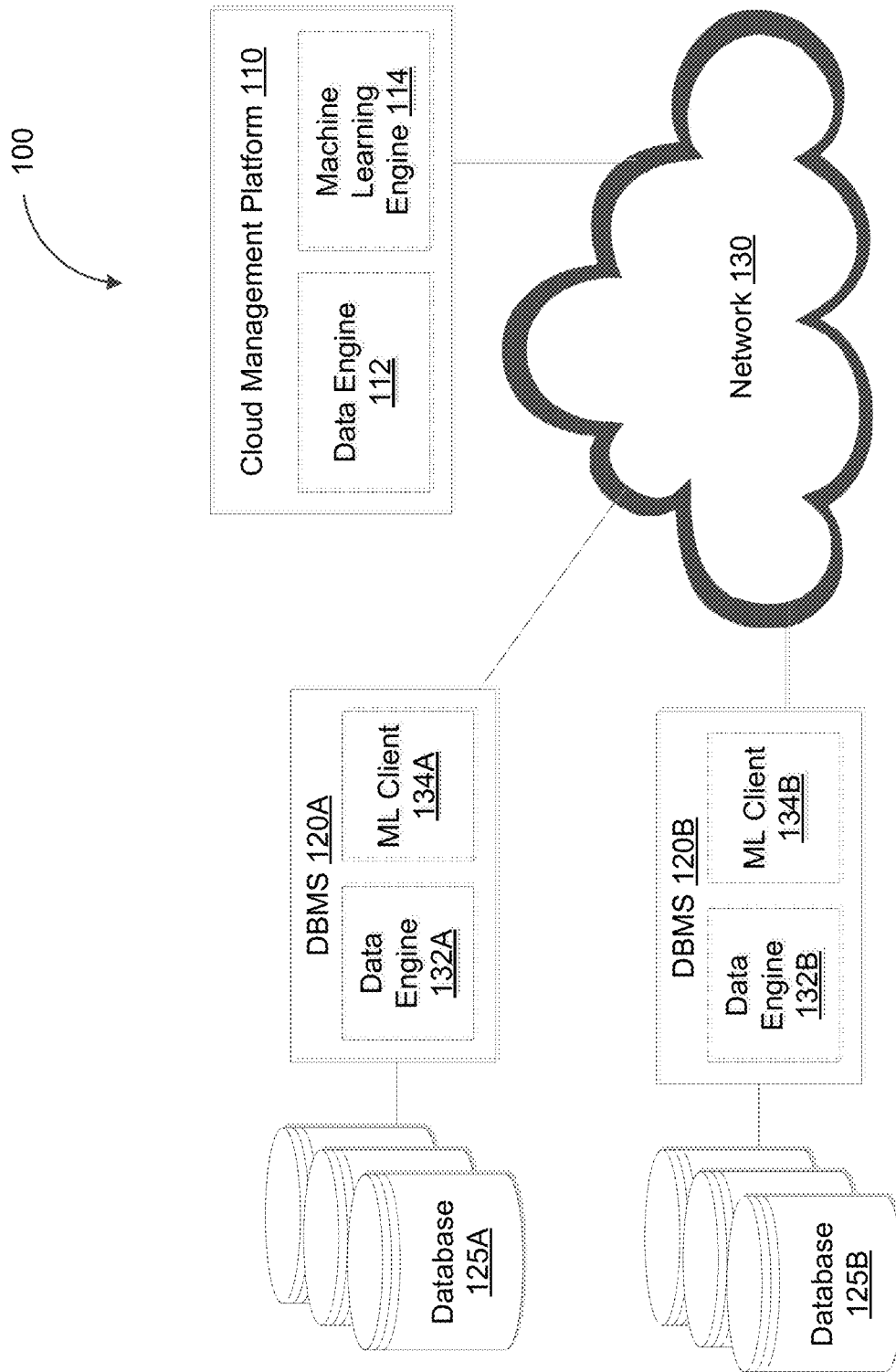
FIG. 1 depicts a system diagram illustrating a machine learning based database management system, in accordance with some example embodiments.

FIG. 1 depicts a system diagram illustrating a machine learning based database management system 100, in accordance with some example embodiments. Referring to FIG. 1, the machine learning based database management system 100 may include a cloud management platform 110. Furthermore, the cloud management platform 110 may be communicatively coupled, via a network 130, to one or more database management systems. For example, the cloud management platform 110 may be communicatively coupled with a first database management system 120A. The first database management system 120A may include a second data engine 132A and a first machine learning client 134A. The first database management system 120A may be coupled with a first database 125A. Alternatively and/or additionally, the cloud management platform 110 may be communicatively coupled with a second database management system 120B. The second database management system 120B may include a third data engine 132B and a second machine learning client 134B. The second database management system 120B may be coupled with a second database 125B. It should be appreciated that the network 130 may be any wired and/or wireless network including, for example, a wide area network (WAN), a local area network (LAN), a public land mobile network (PLMN), the Internet, and/or the like. Furthermore, the first database 125A and/or the second database 125B may be any type of database including, for example, an in-memory database, a relational database, a non-SQL (NoSQL) database, and/or the like.

As shown in FIG. 1, the cloud management platform 110 may include a first data engine 112 and a machine learning engine 114. The machine learning engine 114 may be configured to generate one or more trained machine learning models including, for example, neural networks, classifiers, decision trees, Bayesian networks, regression analyzers, support vector machines, and/or the like. The trained machine learning models may be generated by at least training one or more machine learning models using training data that includes, for example, performance metrics that are known to correspond to the presence of existing and/or developing anomalies. For example, a machine learning model may be trained via one or more supervised and/or unsupervised learning techniques. Training the machine learning model may include optimizing the weights and/or biases applied by the machine learning model in order to minimize an error in an output of the machine learning model.

In some example embodiments, the machine learning engine 114 may deploy the trained machine learning models locally, for example, at the first machine learning client 134A and/or the second machine learning client 134B. Alternatively and/or additionally, the trained machine learning models may also be deployed as a cloud-based and/or web-based service that is accessible to the first database management system 120A and/or the second database management system 120B via the network 130.

In some example embodiments, the first database management system 120A, for example, the second data engine 132A, may collect performance metrics for the first database 125A while the second database management system 120B, for example, the third data engine 132B, may collect performance metrics for the second database 125B. As noted, one or more trained machine learning models may be deployed locally, for example, at the first machine learning client 134A and/or the second machine learning client 134B. Accordingly, the detection of anomalies at the first database 125A and/or the second database 125B may be performed locally, for example, by the first machine learning client 134A and/or the second machine learning client 134B. Furthermore, the first machine learning client 134A and/or the second machine learning client 134B may determine one or more remedial actions for correcting the anomalies at the first database 125A and/or the second database 125B.

For example, the first machine learning client 134A may detect anomalies present and/or developing at the first database 125A by at least processing, with the trained machine learning models deployed at the first machine learning client 134A, the performance metrics collected by the first database management system 120A. In response to detecting one or more anomalies at the first database 125A, the first machine learning client 134A may determine one or more remedial actions. The first database management system 120A may perform at least some of the remedial actions in order to correct and/or prevent the anomalies at the first database 125A.

Alternatively and/or additionally, the second machine learning client 134B may detect anomalies present and/or developing at the second database 125B by at least processing, with the trained machine learning models deployed at the second machine learning client 134B, the performance metrics collected by the second database management system 120B. The second machine learning client 134B may determine one or more remedial actions in response to detecting one or more anomalies at the second database 125B. Furthermore, the second database management system 120B may perform at least some of the remedial actions in order to correct and/or prevent the anomalies at the second database 125B.

In some example embodiments, one or more trained machine learning models may be deployed as a cloud-based and/or web-based service that is accessible to the first database management system 120A and/or the second database management system 120B via the network 130. Thus, the detection of anomalies at the first database 125A and/or the second database 125B may also be performed remotely at the cloud management platform 110. The cloud management platform 110 may determine one or more corrective actions when the cloud management platform 110 detects an anomaly at the first database 125A and/or the second database 125B. Furthermore, the cloud management platform 110 may send, to the first database management system 120A and/or the second database management system 120B, an indication to perform the one or more corrective actions.

To further illustrate, the first database management system 120A, for example, the second data engine 132A, may send, to the cloud management platform 110, the performance metrics collected by the first database management system 120A. Alternatively and/or additionally, the second database management system 120B, for example, the third data engine 132B, may also send, to the cloud management platform 110, the performance metrics collected by the second database management system 120B. The cloud management platform 110 may detect anomalies at the first database 125A and/or the second database 125B by at least processing, with the trained machine learning model deployed at the cloud management platform 110, the performance metrics received from the first database management system 120A and/or the second database management system 120B. At least a portion of the performance metrics received from the first database management system 120A and/or the second database management system 120B may also be used as training data for updating one or more trained machine learning models and/or training additional machine learning models. When the cloud management platform 110 detects an anomaly at the first database 125A and/or the second database 125B, the cloud management platform 110 may determine one or more remedial actions for correcting the anomaly. Furthermore, the cloud management platform 110 may send, to the first database management system 120A and/or the second database management system 120B, an indication to perform the one or more remedial actions.

In some example embodiments, the second data engine 132A and/or the third data engine 132B may be configured to collect performance metrics continuously and/or in accordance to a schedule such as, for example, once every time interval (e.g., x number of minutes). The collection of performance metrics may therefore generate sequences of data such as, for example, time series data, that are indicative of the behavior of the first database 125A and/or the second database 125B over time. Thus, in some example embodiments, the cloud management platform 110 may train one or more machine learning models configured to process data sequences such as, for example, recurrent neural networks and/or the like. However, it should be appreciated that the cloud management platform 110 may train different and/or additional types of trained machine learning models including, for example, feed forward neural networks, classifiers, decision trees, Bayesian networks, regression analyzers, support vector machines, and/or the like.

It should be appreciated that the data that is transferred between the cloud management platform 110, the first database management system 120A, and/or the second database management system 120B may include structured and/or unstructured data in a raw string format. Furthermore, the data may be in a generic format that is agnostic to the type of machine learning model being sent from the first data engine 112 at the cloud management platform 110 to the second data engine 132A at the first database management system 120A and/or the third data engine 132B at the second database management system 120B. The data format may further be agnostic to the type of performance metrics exchanged between the first data engine 112, the second data engine 132A, and/or the third data engine 132B. As such, no new data interfaces are required to support different and/or additional types of machine learning models and/or performance metrics.

Figure 2:
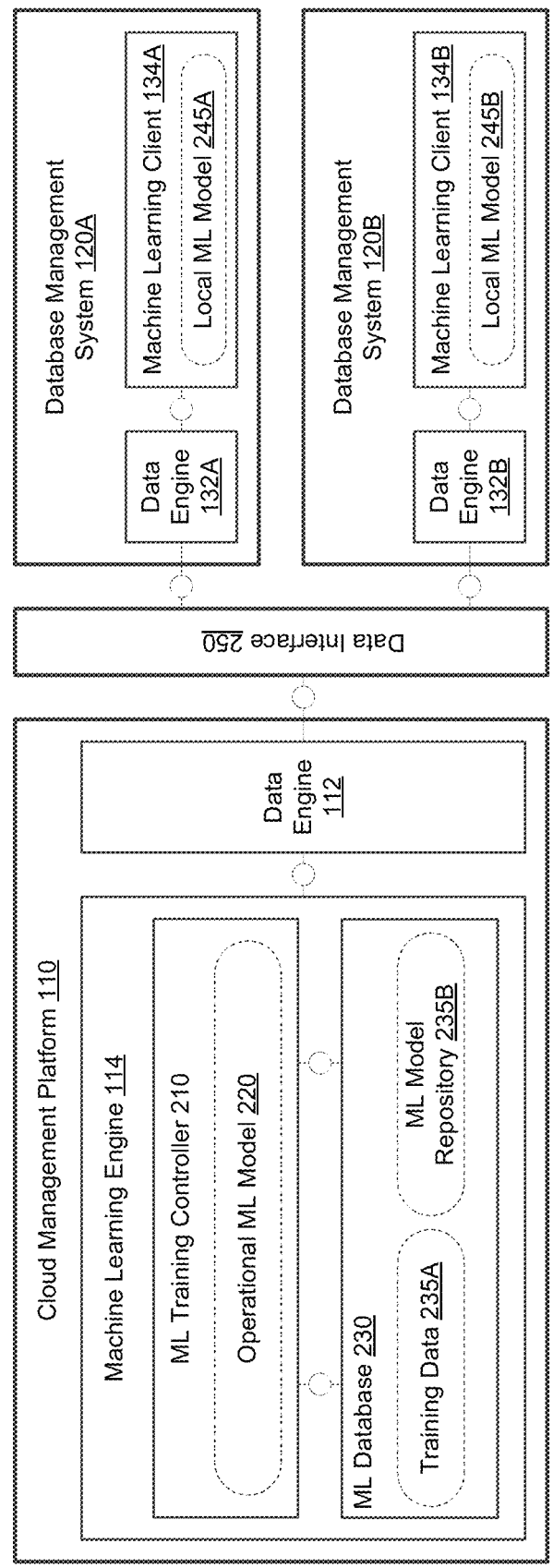
FIG. 2 depicts a machine learning engine, in accordance with some example embodiments.

FIG. 2 depicts the machine learning engine 114, in accordance with some example embodiments. Referring to FIGS. 1-2, the machine learning engine 114 may communicate with the first machine learning client 134A at the first database management system 120A and/or the second machine learning client 134B at the second database management system 120B via a data interface 250. Although not shown, the data interface 250 may be part of the cloud platform 110, the first database management system 120A, and/or the second database management system 120B.

In some example embodiments, the data interface 250 may be configured to translate and/or reformat communications between the first data engine 112, the first database management system 120A, and/or the second database management system 120B. For example, the first data engine 112 may communicate with the second data engine 132A and/or the third data engine 132B in order to propagate one or more trained machine learning models to the first database management system 120A and/or the second database management system 120B. The first data engine 112 may also communicate with the second data engine 132A and/or the third data engine 132B in order to provide, to the first database management system 120A and/or the second database management system 120B, indications to perform remedial actions for correcting anomalies detected at the first database 125A and/or the second database 125B. Alternatively and/or additionally, the second data engine 132A and/or the third data engine 132B may communicate with the first data engine 112 in order to send, to the cloud management platform 110, performance metrics for the first database 125A and/or the second database 125B.

Referring again to FIG. 2, the machine learning engine 114 may include a machine learning training controller 210 and a machine learning database 230. The machine learning database 230 may include training data 235A as well as a machine learning model repository 235B.

In some example embodiments, the machine learning training controller 210 may be configured to generate one or more trained machine learning models including, for example, the operational machine learning model 220. For example, the machine learning training controller 210 may generate the operational machine learning model 220 by processing at least a portion of the training data 235A with one or more machine learning models from the machine learning model repository 235B. The operational machine learning model 220 may be any type of machine learning model including, for example, a neural network, a classifier, a decision tree, a Bayesian network, a regression analyzer, a support vector machine, and/or the like. As noted, the training data 235A may include performance metrics that are known to correspond to the presence of existing and/or developing anomalies. Furthermore, the training data 235A may include performance metrics received from the first database management system 120A and/or the second database management system 120B.

As shown in FIG. 2, the operational machine learning model 220 may be deployed at the machine learning engine 114. For example, the machine learning training controller 210 may be configured to process, with the operational machine learning model 220, performance metrics received, via the data interface 250, from the second data client 132A at the first machine learning client 134A and/or the third data client 132B at the second machine learning client 134B. In doing so, the machine learning training controller 210 may detect anomalies that are present and/or developing at the first database 125A and/or the second database 125B. When the machine learning training controller 210 detects anomalies at the first database 125A and/or the second database 125B, the machine learning training controller 210 may determine one or more remedial actions for correcting and/or preventing the anomalies. The first data engine 112 may send, via the data interface 250, an indication to perform the one or more remedial actions to the second data engine 132A at the first database management system 120A and/or the third data engine 132B at the second database management system 120B.

Alternatively and/or additionally, the operational machine learning model 220 may also be deployed locally, for example, as a first local machine learning model 245A at the first machine learning client 134A and/or as a second local machine learning model 245B at the second machine learning client 134B. The first machine learning client 134A may detect anomalies at the first database 125A by at least processing, using the first local machine learning model 245A, performance metrics from the first database 125A. In response to detecting one or more anomalies at the first database 125A, the first machine learning client 134A may determine one or more remedial actions for correcting and/or preventing the anomalies. Meanwhile, the second machine learning client 134B may detect anomalies at the second database 125B by at least processing, using the second local machine learning model 245B, performance metrics from the second database 125B. The second machine learning client 134B may respond to the detection of one or more anomalies at the second database 125B by determining one or more remedial actions for correcting and/or preventing the anomalies. In some example embodiments, the first database management system 120A and/or the second database management system 120B may perform at least some of the remedial actions in order to correct and/or prevent the anomalies at the first database 125A and/or the second database 125B.

Figure 3:
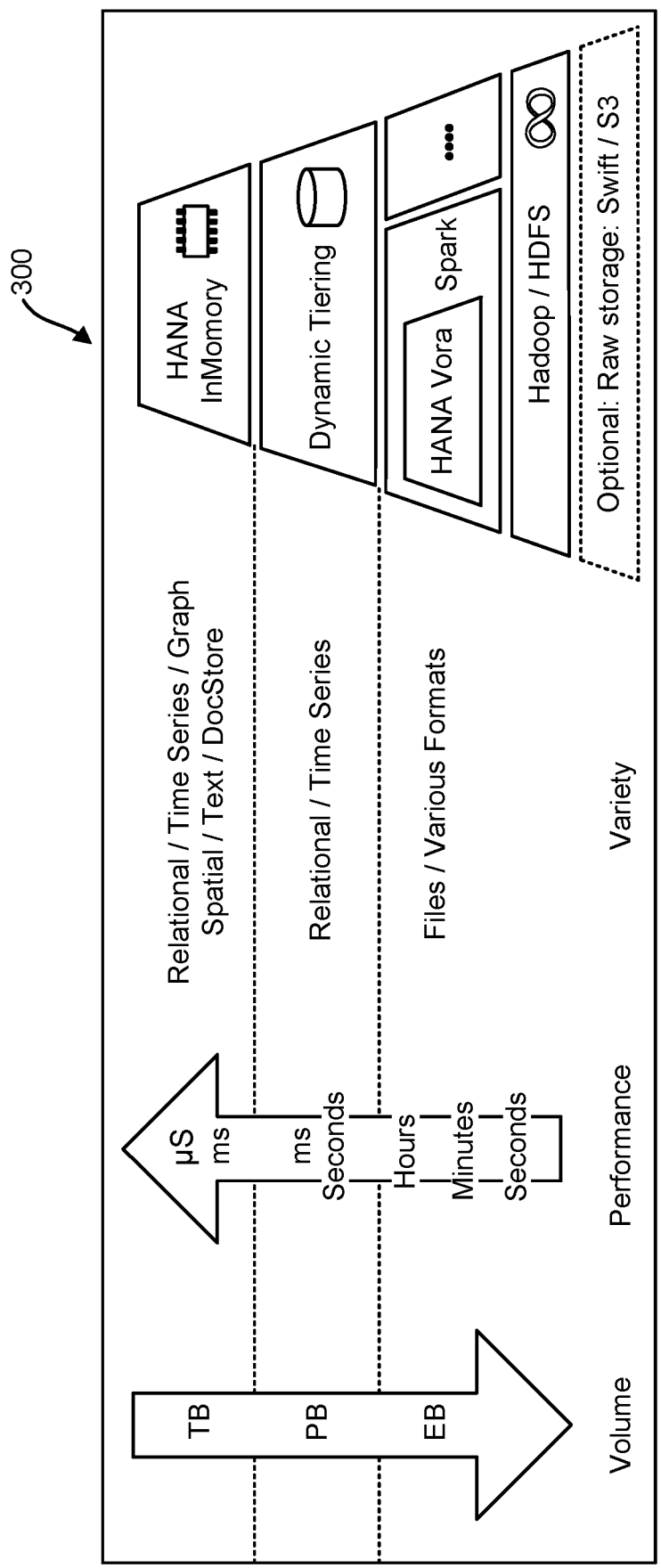
FIG. 3 depicts a data storage scheme for storing training data, in accordance with some example embodiments.

FIG. 3 depicts a data storage scheme 300 for storing the training data 235A, in accordance with some example embodiments. As shown in FIG. 3, the data storage scheme 300 may require storing different varieties of the training data 235A in different storage areas within, for example, the machine learning database 230 based on the age of the training data and/or the performance for accessing the training data. For instance, more recent training data, which may include relational data, time series data, spatial data, textual data, and a document store, may be held in-memory for fast access. Meanwhile, less recent training, which may include files, may be held in a portion of the database, such as mass data storage, that requires more time to access.

Figure 4A:
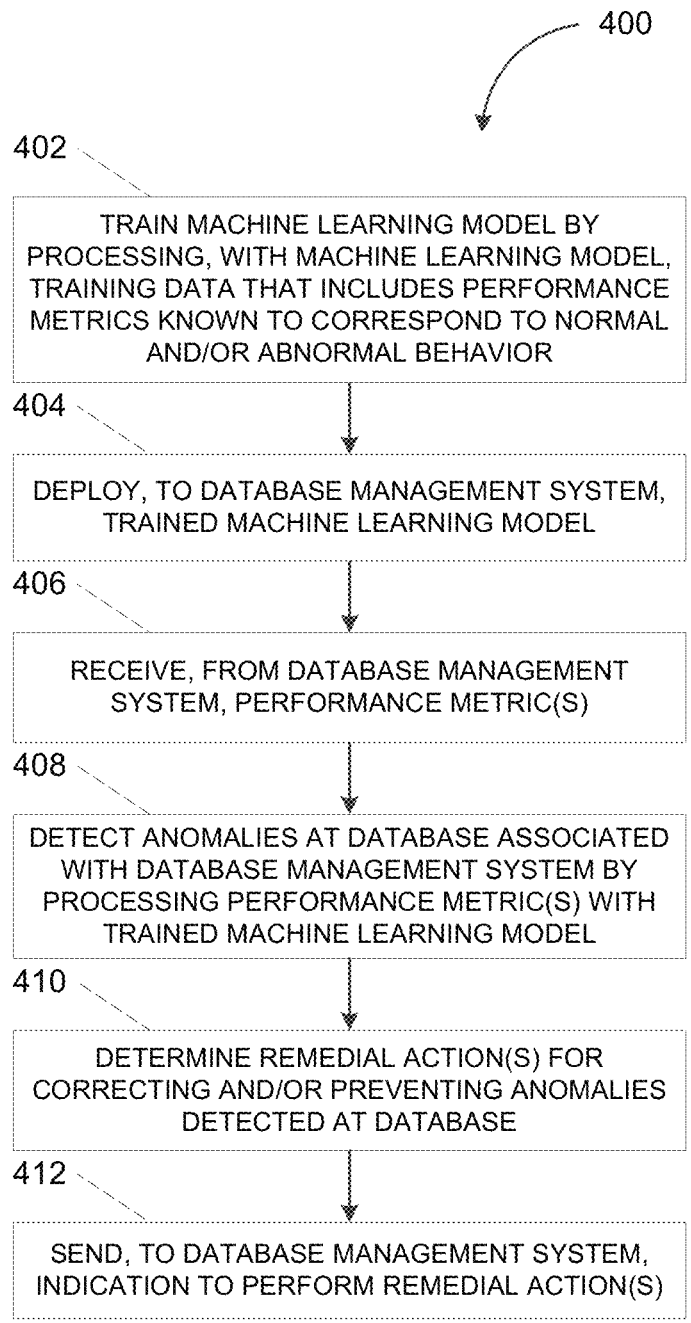
FIG. 4A depicts a flowchart illustrating a process for machine learning based database management, in accordance with some example embodiments.

FIG. 4A depicts a flowchart illustrating a process 400 for machine learning based database management, in accordance with some example embodiments. Referring to FIGS. 1-4A, the process 400 may be performed by the cloud management platform 110, for example, by the machine learning engine 114.

At 402, the cloud management platform 110 may train a machine learning model by at least processing, with the machine learning model, training data that includes performance metrics that are known to correspond to the presence of existing and/or developing anomalies. For example, the cloud management platform 110 may train one or more machine learning models from the machine learning model repository 235B by processing, with the one or more machine learning models, at least a portion of the training data 235A. In doing so, the cloud management platform 110 may generate the operational machine learning model 220.

At 404, the cloud management platform 110 may deploy, to a database management system, the trained machine learning model. For example, the operational machine learning model 220 may be deployed as the first local machine learning model 245A at the first machine learning client 134A and/or the second local machine learning model 245B at the second machine learning client 134B. Propagating the operational machine learning model 220 to the first machine learning client 134A and/or the second machine learning client 134B may enable the detection of anomalies to be performed locally, for example, at the first database management system 120A and/or the second database management system 120B. It should be appreciated that the cloud management platform 110 may continue to update the first local machine learning model 245A and/or the second machine learning model 245B. Furthermore, as noted, the operational machine learning model 220 may also be deployed at the cloud management platform 110 and accessed as a cloud-based and/or a web-based service.

At 406, the cloud management platform 110 may receive, from a database management system, one or more performance metrics. For example, the first data engine 112 at the cloud management platform 110 may receive, from the second data engine 132A at the first database management system 120A, performance metrics for the first database 125A. Alternatively and/or additionally, the first data engine 112 at the cloud management platform 110 may receive, from the third data engine 132B at the second database management system 120B, performance metrics for the second database 125B. The performance metrics may include, for example, performance per SQL statement, application performance per dialog step, database central processing unit (CPU) utilization, database memory consumption, application errors, database update process errors, and/or the like.

At 408, the cloud management platform 110 may detect anomalies at a database associated with the database management system by at least processing the one or more performance metrics with the trained machine learning model. For example, the cloud management platform 110 may process, with the operational machine learning model 220, the performance metrics received from the first database management system 120A and/or the second database management system 120B. Processing the performance metrics with the operational machine learning model 220 may enable the cloud management platform 110 to detect one or more anomalies such as, for example, bottlenecks and/or the like, at the first database 125A and/or the second database 125B. As noted, these anomalies may be present and/or developing at the first database 125A and/or the second database 125B.

At 410, the cloud management platform 110 may determine one or more remedial actions for correcting and/or preventing the anomalies detected at the database. For instance, the cloud management platform 110 may determine remedial actions for correcting the anomalies that are present and/or developing within the first database 125A and/or the second database 125B. The remedial actions may include, for example, a parameter change at the first database 125A and/or the second database 125B, a parameter change for one or more applications running at the first database 125A and/or the second database 125B, and/or the like.

At 412, the cloud management platform 110 may send, to the database management system, an indication to perform the one or more remedial actions. For example, the first data engine 132A at the cloud management platform 110 may send, to the second data engine 132A at the first database management system 120A and/or the third data engine 132B at the second database management system 120B, an indication to perform the remedial actions for correcting the anomalies detected at the first database 125A and/or the second database 125B.

Figure 4B:
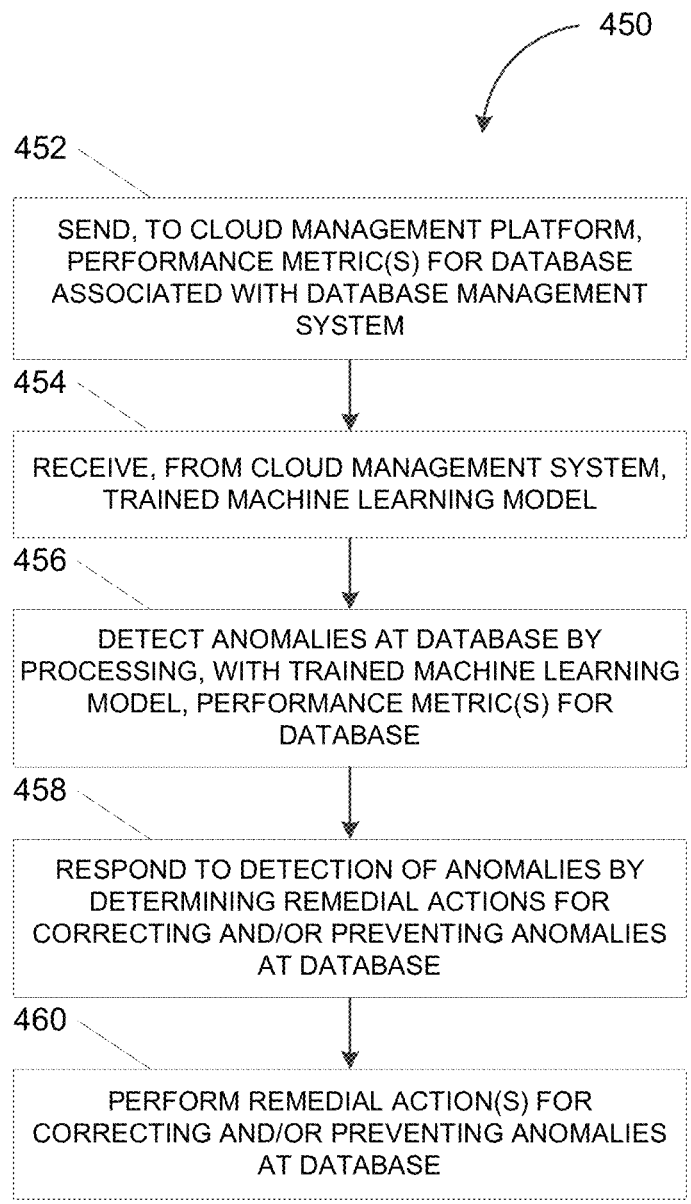
FIG. 4B depicts a flowchart illustrating a process for machine learning based database management, in accordance with some example embodiments.

FIG. 4B depicts a flowchart illustrating a process 450 for machine learning based database management, in accordance with some example embodiments. Referring to FIGS. 1-4B, the process 450 may be performed by a database management system such as, for example, the first database management system 120A and/or the second database management system 120B.

At 452, a database management system may send, to the cloud management platform 110, one or more performance metrics for a database associated with the database management system. In some example embodiments, the detection of anomalies may be performed by a trained machine learning model (e.g., the operational machine learning model 220) that is deployed as a web-based and/or cloud-based service at the cloud management platform 110. As such, the second data engine 132A at the first database management system 120A and/or the third data engine 132B the second database management system 120B may send, to the first data engine 112 the cloud management platform 110, one or more performance metrics for the first database 125A and/or the second database 125B. The cloud management platform 110 may process, with the operational machine learning model 220, the performance metrics received from the first database management system 120A and/or the second database management system 120B in order to detect anomalies that may be present and/or developing at the first database 125A and/or the second database 125B. Alternatively and/or additionally, the performance metrics from the first database management system 120A and/or the second database management system 120B may be added to the training data 235A and used for updating one or more trained machine learning models and/or training additional machine learning models.

At 454, the database management system may receive, from the cloud management platform 110, a trained machine learning model. As noted, a trained machine learning model such as, for example, the operational machine learning model 220, may be deployed locally at the first database management system 120A and/or the second database management system 120B instead of and/or in addition to being deployed at the cloud management platform 110. For instance, the first data engine 112 at the cloud management platform 110 may send, to the second data engine 132A at the first database management system 120A and/or the third data engine 132B at the second database management system 120B, the operational machine learning model 220 such that the operational machine learning model 220 may be deployed as the first local machine learning model 245A at the first machine learning client 134A and/or the second local machine learning model 245B at the second machine learning client 134B. Deploying the operational machine learning model 220 locally may enable the detection of anomalies to be performed locally, for example, at the first database management system 120A and/or the second database management system 120B.

At 456, the database management system may detect one or more anomalies at the database by at least processing, with the trained machine learning model, one or more performance metrics for the database. For example, the first database management system 120A may process, with the first local machine learning model 245A, one or more performance metrics for the first database 125A, thereby detecting anomalies that may be present and/or developing at the first database 125A. Alternatively and/or additionally, the second database management system 120B may process, with the second local machine learning model 245B, one or more performance metrics for the second database 125B, thereby detecting anomalies that may be present and/or developing at the second database 125B. As noted, the performance metrics may include, for example, performance per SQL statement, application performance per dialog step, database central processing unit (CPU) utilization, database memory consumption, application errors, database update process errors, and/or the like.

At 458, the database management system may respond to the detection of one or more anomalies at the database by at least determining one or more remedial actions for correcting and/or preventing the one or more anomalies at the database. For instance, the first database management system 120A may determine remedial actions such as, for example, a parameter change at the first database 125A, a parameter change for one or more applications running at the first database 125A, and/or the like. Similarly, the second database management system 120B may determine remedial actions for correcting anomalies that are present and/or developing at the second database 125B.

At 460, the database management system may perform the one or more remedial actions for correcting and/or preventing the one or more anomalies at the database. For instance, the first database management system 120A may perform one or more remedial actions for correcting the anomalies that are present and/or developing within the first database 125A. Similarly, the second database management system 120B may also perform one or more remedial actions for correcting anomalies that are present and/or developing at the second database 125B.

Figure 5:
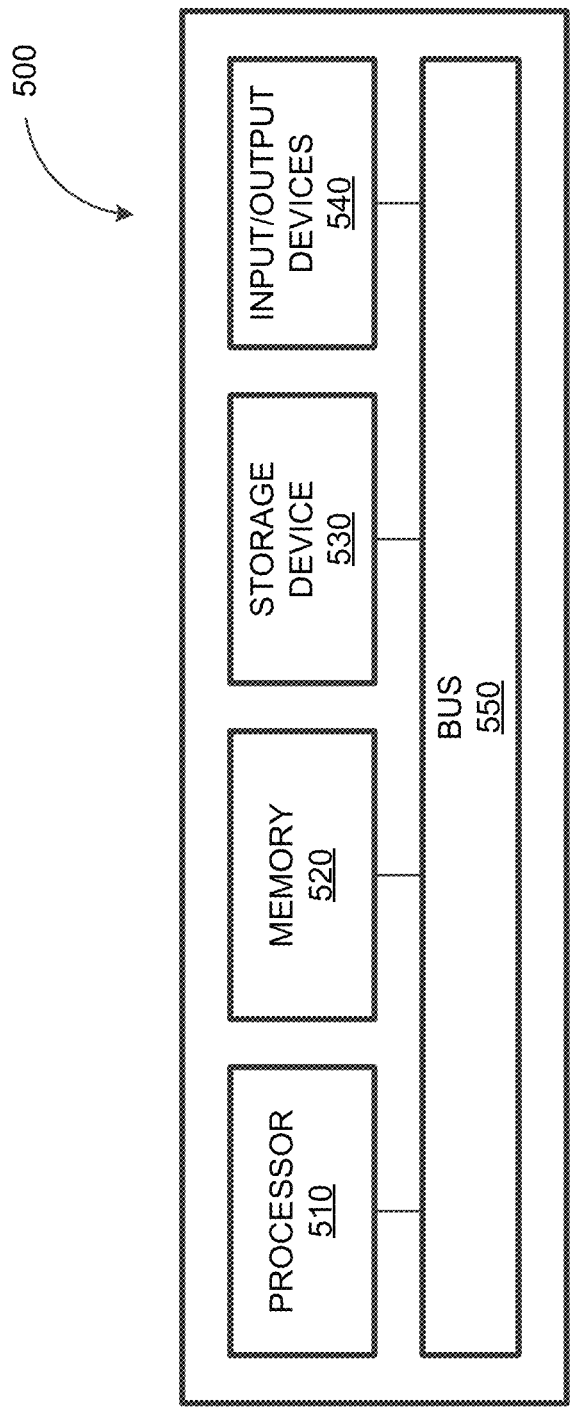
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the cloud management platform 110, the first database management system 120A, the second database management system 120B, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the cloud management platform 110, the first database management system 120A, and/or the second database management system 120B. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein.

Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving, from a first database system, one or more first performance metrics associated with an anomaly at the first database system;
   storing, at a cloud-based management platform, a training data comprising time-series data that includes a first training data having a first age and/or a second training data having a second age, the one or more first performance metrics being stored as part of the first training data in a first storage area of the cloud-based management platform having a first access performance, and the second training data being stored in a second storage area of the cloud-based management platform having a second access performance;
   retrieving the first training data to update, based at least on the first training data, a machine learning model trained to detect an anomaly that is present and/or developing in one or more database systems;
   detecting an anomaly that is present and/or developing at a second database system by at least processing, with the trained machine learning model, one or more second performance metrics received from the second database system;
   in response to detecting the anomaly at the second database system, determining one or more remedial actions for correcting and/or preventing the anomaly at the second database system, and sending, to a database management system associated with the second database system, the one or more remedial actions; and
   updating, based at least on the one or more second performance metrics associated with the second database system, the trained machine learning model.

2. The system of claim 1, further comprising:
   receiving, from the database management system, the one or more second performance metrics associated with the second database system.

3. The system of claim 1, wherein the one or more first performance metrics and the one or more second performance metrics include performance per structured query language (SQL) statement, application performance per dialog step, database central processing unit (CPU) utilization, database memory consumption, application errors, and/or database update process errors.

4. The system of claim 1, further comprising:
   sending, to the database management system of the second database system, the trained machine learning model, the trained machine learning model being sent to the database management system to enable the one or more second performance metrics to be processed at least partially at the database management system; and
   sending to the database management system, at least one update for the trained machine learning model.

5. The system of claim 1, wherein the machine learning model comprises a neural network, a classifier, a decision tree, a Bayesian network, a regression analyzer, and/or a support vector machine.

6. The system of claim 1, wherein the one or more remedial actions include a parameter change at the second database system and/or a parameter change for an application running at the second database system.

7. The system of claim 1, wherein the database management system is configured to execute the one or more remedial actions.

8. The system of claim 1, wherein the one or more remedial actions are sent to the database management system using a generic data format.

9. The system of claim 1, wherein the one or more remedial actions are sent to the database management system as structured data and/or unstructured data in a raw string format.

10. A computer-implemented method, comprising:
    receiving, from a first database system, one or more first performance metrics associated with an anomaly at the first database system;
    storing, at a cloud-based management platform, a training data comprising time-series data that includes a first training data having a first age and/or a second training data having a second age, the one or more first performance metrics being stored as part of the first training data in a first storage area of the cloud-based management platform having a first access performance, and the second training data being stored in a second storage area of the cloud-based management platform having a second access performance;
    retrieving the first training data to update, based at least on the first training data, a machine learning model trained to detect an anomaly that is present and/or developing in one or more database systems;
    detecting an anomaly that is present and/or developing at a second database system by at least processing, with the trained machine learning model, one or more second performance metrics received from the second database system;
    in response to detecting the anomaly at the second database system, determining one or more remedial actions for correcting and/or preventing the anomaly at the second database system, and sending, to a database management system associated with the second database system, the one or more remedial actions; and
    updating, based at least on the one or more second performance metrics associated with the second database system, the trained machine learning model.

11. The method of claim 10, further comprising:
    receiving, from the database management system, the one or more second performance metrics associated with the second database system.

12. The method of claim 10, wherein the one or more first performance metrics and the one or more second performance metrics include performance per structured query language (SQL) statement, application performance per dialog step, database central processing unit (CPU) utilization, database memory consumption, application errors, and/or database update process errors.

13. The method of claim 10, further comprising:
sending, to the database management system of the second database system, the trained machine learning model, the trained machine learning model being sent to the database management system to enable the one or more second performance metrics to be processed at least partially at the database management system; and
sending to the database management system, at least one update for the trained machine learning model.

14. The method of claim 10, wherein the machine learning model comprises a neural network, a classifier, a decision tree, a Bayesian network, a regression analyzer, and/or a support vector machine.

15. The method of claim 10, wherein the one or more remedial actions include a parameter change at the second database system and/or a parameter change for an application running at the second database system.

16. The method of claim 10, wherein the database management system is configured to execute the one or more remedial actions.

17. The method of claim 10, wherein the one or more remedial actions are sent to the database management system using a generic data format.

18. A non-transitory computer-readable storage medium including program code, which when executed by at least one data processor, causes operations comprising:
receiving, from a first database system, one or more first performance metrics associated with an anomaly at the first database system;
storing, at a cloud-based management platform, a training data comprising time-series data that includes a first training data having a first age and/or a second training data having a second age, the one or more first performance metrics being stored as part of the first training data in a first storage area of the cloud-based management platform having a first access performance, and the second training data being stored in a second storage area of the cloud-based management platform having a second access performance;
retrieving the first training data to update, based at least on the first training data, a machine learning model trained to detect an anomaly that is present and/or developing in one or more database systems;
detecting an anomaly that is present and/or developing at a second database system by at least processing, with the trained machine learning model, one or more second performance metrics received from the second database system;
in response to detecting the anomaly at the second database system, determining one or more remedial actions for correcting and/or preventing the anomaly at the second database system, and sending, to a database management system associated with the second database system, the one or more remedial actions; and
updating, based at least on the one or more second performance metrics associated with the second database system, the trained machine learning model.

\* \* \* \* \*